(12) United States Patent
Anderson et al.

(10) Patent No.: US 9,476,968 B2
(45) Date of Patent: Oct. 25, 2016

(54) SYSTEM AND METHOD FOR MONITORING OPTICAL SUBSYSTEM PERFORMANCE IN CLOUD LIDAR SYSTEMS

(71) Applicant: Rosemount Aerospace Inc., Burnsville, MN (US)

(72) Inventors: Kaare J. Anderson, Farmington, MN (US); Mark D. Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 131 days.

(21) Appl. No.: 14/340,048

(22) Filed: Jul. 24, 2014

(65) Prior Publication Data

US 2016/0025842 A1    Jan. 28, 2016

(51) Int. Cl.
| G01S 7/497 | (2006.01) |
| G01M 11/00 | (2006.01) |
| G01S 17/95 | (2006.01) |

(52) U.S. Cl.
CPC ............... *G01S 7/497* (2013.01); *G01M 11/00* (2013.01); *G01S 7/4972* (2013.01); *G01S 17/95* (2013.01); *G01S 2007/4975* (2013.01)

(58) Field of Classification Search
CPC .................. G01S 7/497; G01S 17/95; G01S 2007/4975; G01M 11/00
USPC ........... 356/4.01, 6, 301, 451; 250/205, 216; 340/933, 962
See application file for complete search history.

(56) References Cited

U.S. PATENT DOCUMENTS

| 4,722,599 A | 2/1988 | Fruengel et al. |
| 5,515,156 A | 5/1996 | Yoshida et al. |
| 7,486,386 B1 * | 2/2009 | Holcombe ............... G01C 3/08 356/4.01 |
| 7,623,234 B2 * | 11/2009 | Puzey ..................... C12Q 1/04 356/326 |
| 8,841,598 B2 * | 9/2014 | Volkel ................... G01S 17/026 250/214.1 |
| 2002/0018198 A1 * | 2/2002 | Pierenkemper ....... G01S 7/4817 356/4.01 |
| 2004/0036630 A1 * | 2/2004 | Jamieson ............... B64D 15/20 340/962 |
| 2004/0179186 A1 * | 9/2004 | Meneely .................. G01C 5/00 356/4.01 |
| 2007/0165215 A1 * | 7/2007 | Haridas ..................... G01J 3/02 356/301 |
| 2010/0007870 A1 | 1/2010 | Haberer et al. |
| 2011/0147460 A1 * | 6/2011 | Nubling ................. G02B 26/10 235/470 |
| 2011/0220779 A1 | 9/2011 | Takaoka |
| 2011/0246116 A1 | 10/2011 | Kamitani et al. |
| 2012/0104225 A1 * | 5/2012 | McEldowney ....... G01J 1/0228 250/205 |
| 2013/0099943 A1 * | 4/2013 | Subramanya ......... G01S 7/2926 340/933 |

FOREIGN PATENT DOCUMENTS

| DE | 4340756 A1 | 6/1994 |
| EP | 1959271 A1 | 8/2008 |

OTHER PUBLICATIONS

Extended European Search report for European Patent Application No. 15178076.6, dated Dec. 12, 2015.

* cited by examiner

*Primary Examiner* — Sang Nguyen
(74) *Attorney, Agent, or Firm* — Locke Lord LLP

(57) ABSTRACT

A method of detecting optical subsystem failures includes emitting a pulsed light beam from a laser through a window. A reflection signal indicative of a portion of the beam reflected by the window is compared to an expected signal to monitor for degradation of an optical component.

15 Claims, 4 Drawing Sheets

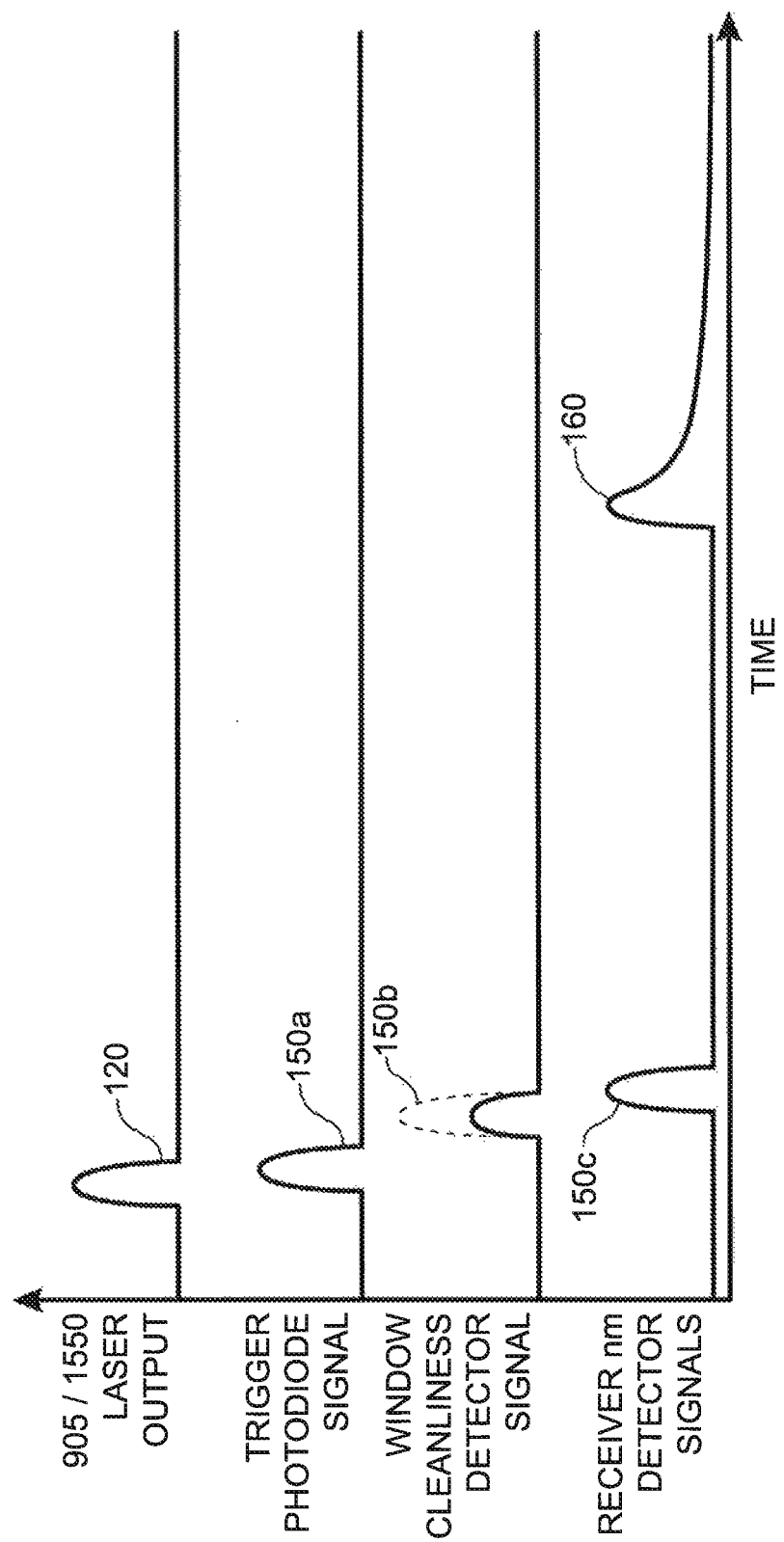

| FAULT | DETECTED BY COMPARISON OF: |
|---|---|
| LASER FAILURE/ DEGRADATION | - TPD AMPLITUDE VS. EXPECTATION<br>- TPD PULSE WIDTH VS. EXPECTATION<br>- TPD PULSE FREQUENCY VS. EXPECTATION |
| TRANSMITTER OPTICS MISALIGNMENT | - TPD AMPLITUDE VS. WCD AMPLITUDE<br>- TPD AMPLITUDE VS. 905 & 1550 WINDOW REFLECTION AMPLITUDES |
| WINDOW CONTAMINATION | - WCD AMPLITUDE VS. EXPECTATION<br>- WCD AMPLITUDE VS. TPD AMPLITUDE |
| RECEIVER OPTICS MISALIGNMENT | - RECEIVER PHOTO DETECTOR WINDOW REFLECTION AMPLITUDE VS. TPD AMPLITUDE<br>- RECEIVER PHOTO DETECTOR WINDOW REFLECTION AMPLITUDE VS. WCD AMPLITUDE |
| RECEIVER DETECTOR DEGRADATION | - RECEIVER PHOTO DETECTOR WINDOW REFLECTION AMPLITUDE VS. TPD AMPLITUDE<br>- RECEIVER PHOTO DETECTOR WINDOW REFLECTION AMPLITUDE VS. WCD AMPLITUDE |

*FIG. 4*

SYSTEM AND METHOD FOR MONITORING OPTICAL SUBSYSTEM PERFORMANCE IN CLOUD LIDAR SYSTEMS

BACKGROUND OF THE INVENTION

1. Field of the Invention

The present disclosure relates to optics, and more particularly to monitoring performance of optical components.

2. Description of Related Art

A cloud LIDAR system uses lasers and an optical transmitter subsystem to illuminate a portion of a cloud and an optical receiver coupled to a series of photodetectors to measure the reflected light. These measurements are then processed by onboard digital electronics to calculate cloud parameters. In a system such as this, it is beneficial to detect and report faults and/or performance degradation of the optical and electro-optical components, such as lasers, transmitter subsystems and photodetectors. Typical LIDAR systems require multiple additional photodetectors solely for the purpose of detecting failures.

Such conventional methods and systems have generally been considered satisfactory for their intended purpose. However, the inclusion of multiple additional photodetectors solely for detecting optical failures adds to a LIDAR system's cost and complexity. The present disclosure provides a solution that performs the same task, but uses photodetectors that are already present within the system.

SUMMARY OF THE INVENTION

A method of detecting optical subsystem failures includes emitting a pulsed light beam from a laser through a window. A reflection signal indicative of a portion of the beam reflected by the window is compared to an expected signal to monitor for degradation of an optical component. The light beam can be emitted at a predetermined frequency.

Laser degradation can be monitored by comparing amplitude, pulse width and pulse frequency of a reflection signal received at a trigger photo diode to amplitude, pulse width and pulse frequency of the expected signal.

Transmitter optic misalignment can also be detected by comparing amplitude of a reflection signal received at a trigger photo diode with amplitude of a reflection signal received by a window cleanliness detector. In certain embodiments, detecting transmitter optic misalignment can be accomplished by comparing amplitude of a reflection signal received at a trigger photo diode with amplitude of a reflection signal received by one or more receiver photodetectors.

Contamination of an external window can be detected by comparing amplitude of a reflection signal received at a window cleanliness detector with amplitude of the expected signal. In certain embodiments, detecting window contamination can be completed by comparing amplitude of a reflection signal received at a window cleanliness detector with amplitude of a reflection signal received at a trigger photo diode.

Receiver optics misalignment and photodetector degradation can be monitored by comparing amplitude of a reflection signal received one or more receiver photodetectors with amplitude of a reflection signal received at a trigger photo diode. In certain embodiments, detecting receiver optics misalignment and photodetector degradation can be done by comparing amplitude of a reflection signal received at one or more receiver photodetectors with amplitude of a reflection signal received at a window cleanliness detector.

The optical components being monitored can include transmitter optics, receiver optics, lasers and/or photodetectors. It is also contemplated that the optical component can be the window itself.

A system for monitoring performance of optical components includes a laser and a plurality of optical components. A processor is operatively connected to a memory. The memory includes instructions recorded thereon that, when read by the processor, cause the processor to compare a reflection signal indicative of a portion of a light beam emitted by the laser and reflected by the optical component to an expected signal to monitor for degradation of at least one optical component.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a graphic view of exemplary emitted signals and reflection signals over time, illustrating optical component performance; and FIG. 4 is a chart showing comparisons of reflection signals used to indicate optical component performance.

DETAILED DESCRIPTION OF THE PREFERRED EMBODIMENTS

Figure 1:
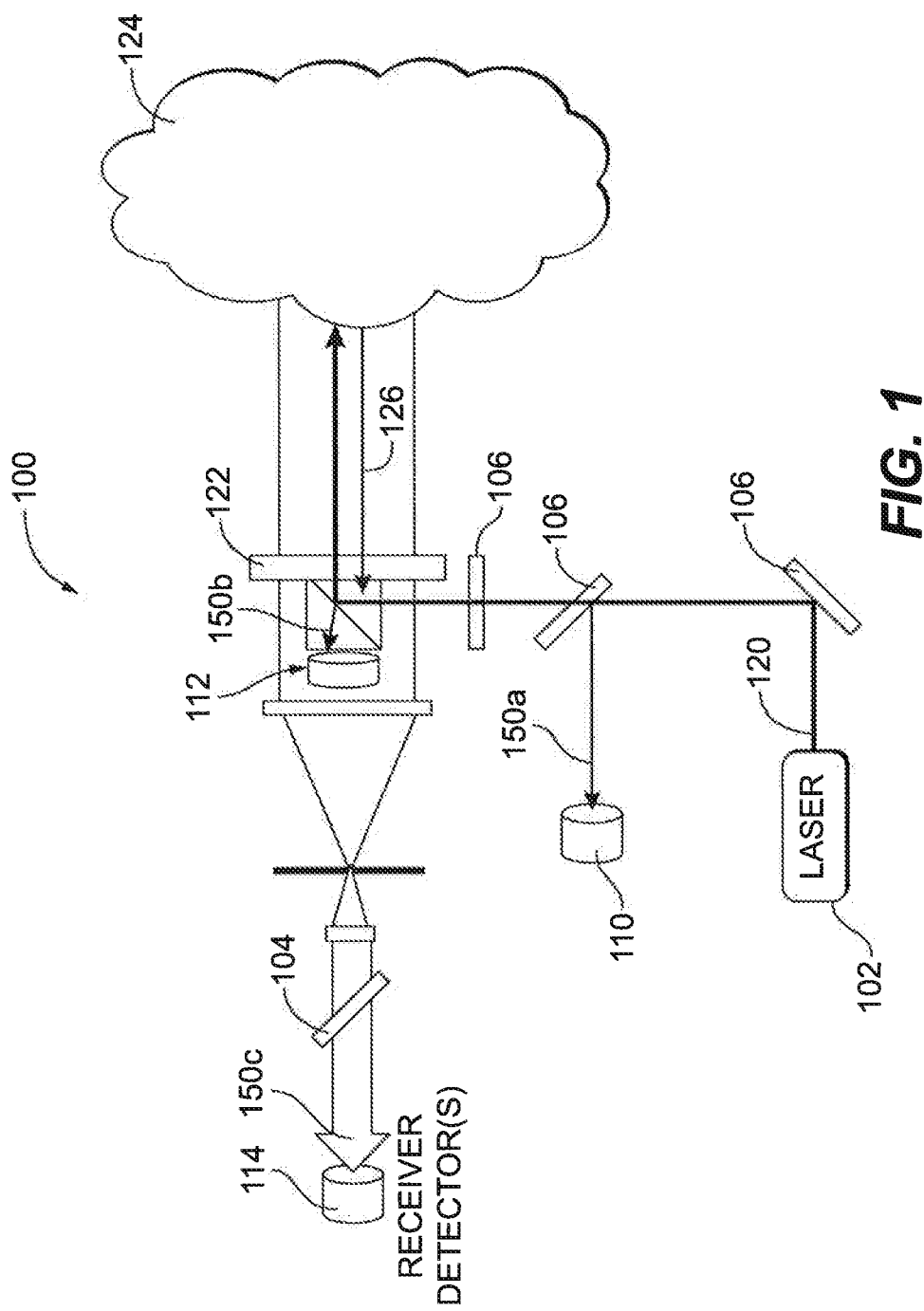
FIG. 1 is a schematic view of an exemplary embodiment of a system for monitoring performance of optical components of a LIDAR system constructed in accordance with the present disclosure, showing reflections from a window for monitoring a plurality of optical components.

Reference will now be made to the drawings wherein like reference numerals identify similar structural features or aspects of the subject disclosure. For purposes of explanation and illustration, and not limitation, a partial view of an exemplary embodiment of a system and method for monitoring optical performance in accordance with the disclosure is shown in FIG. 1 and is designated generally by reference character 100. Other embodiments of systems and methods in accordance with the disclosure, or aspects thereof, are provided in FIGS. 2-4, as will be described.

FIG. 1 illustrates a LIDAR system 100 in accordance with the present disclosure for monitoring performance of optical components. System 100 includes a laser 102 and a plurality of optical components. As shown in FIG. 1, optical components include receiver optics 104, transmitter optics 106, photodetectors 110, 112, 114 and window 122. Photodetectors 110, 112, 114 include but are not limited to a trigger photodiode (TPD) 110, a photodetector measuring reflection off of window 122, e.g., a window cleanliness photodetector (WCD) 112, and receiver photodetectors 114, which may include but are not limited to a 950 nm photodetector and a 1550 nm photodetector. Additional optical components for operation of the LIDAR system 100 can be included. It will be understood that the number of optical components shown herein is exemplary and that any other suitable number and/or type of sensor can be used without departing from the scope of this disclosure.

A pulsed light beam 120 is emitted from the laser 102 through an external window 122 towards a cloud 124. A portion of the light beam 120 is reflected towards the TPD as reflection signal 150a while a portion of the emitted light beam 120 exits through the external window 122 towards the cloud 124. When a cloud 124 is present a return signal 126 is reflected back towards system 100. A portion of the emitted light beam 120 is reflected by the external window 122 without passing through to the cloud 124. This reflected portion passes through several of the optical components and is received as reflection signals 150b and 150c by photodetectors 112 and 114.

Figure 2:
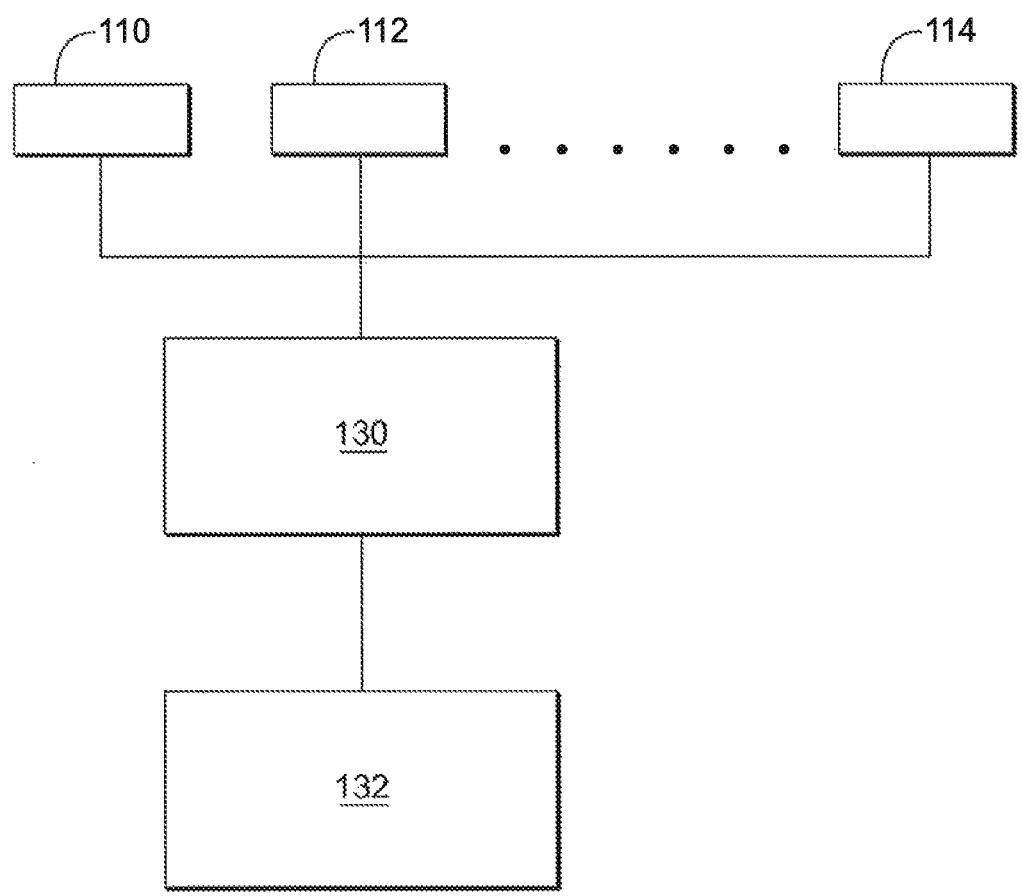
FIG. 2 is a schematic view of a portion of the system of FIG. 1, showing a processor and memory of the system.

Referring now to FIG. 2, system 100 includes a processor 130 operatively connected to a memory 132. Processor 130 is operatively connected to the photodetectors 110, 112, 114 for receiving reflection signals 150a, 150b, 150c. The ellipses shown in FIG. 2 indicate that while three photodetectors 110, 112, 114 are shown and described, any suitable number of photodetectors can be included. Memory 132 includes instructions recorded thereon that, when read by processor 130, cause processor 130 to perform the functions described herein with respect to methods of monitoring performance of optical components.

Upon receiving reflection signals 150a, 150b, 150c at each respective photodetector 110, 112, 114, processor 130 compares the reflection signals 150a, 150b, 150c with a respective expected signal. An expected signal is based off system calibration when the optical components are in good working order. A reflected signal is compared to another received signal, for example, from a different optical component, relative to an expected value. Accordingly, the comparison of the reflection signal 150a, 150b, 150c to the expected signal indicates the performance of the particular optical component.

For example, as shown in FIG. 3, amplitude of an emitted signal 120 and reflection signals 150a, 150b, 150c received at the photodetectors 110, 112, 114 is plotted over time. The emitted signal 120 is emitted from the laser at a predetermined frequency. Reflection signal 150a received at the TPD 110 has an amplitude and pulse width within the expected range. Therefore, this indicates that the laser performance is optimal. Amplitude of reflection signal 150b received at the WCD 112 indicates whether the external window 122 is clean or dirty. As shown, a dirty external window 122 will produce a reflection signal 150b with a greater amplitude than a clean window. In FIG. 3, the amplitude of reflection signal 150b for a dirty window is shown in broken lines, and the corresponding solid line shows the amplitude for signal 150b for a clean window. Comparison of the amplitude of the reflection signal 150b received at the window cleanliness detector with the amplitude of reflection signal 150a received at the trigger photodiode can be used to indicate misalignment of the transmitter optics 106. Amplitude of reflection signal 150c received at the receiver photodetectors 114, can indicate receiver optic misalignment or photodetector degradation when compared with the amplitude of reflection signals 150a, 150b received at the TPD 110 or the WCD 112. It will be noted that peak 160 indicates a later returned signal 126 received at the receiver photodetectors 114 based on cloud reflection. In other words, peak 160 represents a returned signal 126 when a cloud 124 is present.

As shown this returned signal 126 is spaced a sufficient time later than reflection signal 150c so as not to obscure the comparison used to indicate optical component performance.

FIG. 4 shows the performance measure or fault of a particular optical component based on various comparisons between reflection signals and expected signals.

For example, laser 102 failure or degradation is indicated by a comparison between either amplitude, pulse width, or pulse frequency of the reflection signal received at the TPD 150a and a respective expected signal. Transmitter optic 106 misalignment can be determined by comparing amplitude of the reflection signal received at the TPD 150a with amplitude of the reflection signal received by the WCD 150b. Transmitter optic 106 misalignment can also be determined by comparing amplitude of the reflection signal received at the TPD 150a with amplitude of the reflection signal received by the receiver photodetectors 150c. Window 122 contamination is monitored by comparing amplitude of the reflection signal received at the WCD 150b with amplitude of a respective expected signal. Window 122 contamination can also be monitored by comparing amplitude of the reflection signal received at the WCD 150b with amplitude of the reflection signal received at the TPD 120a. Receiver optic 104 misalignment and photodetector degradation can be detected by comparing amplitude of the reflection signal measured by the receiver photodetectors 150c with amplitude of the reflection signal received at a TPD 150a. Receiver optic 104 misalignment and photodetector degradation can also be monitored by comparing amplitude of the reflection signal received at the receiver photodetectors 150c with amplitude of the reflection signal received at the WCD 150b.

It will be noted that the comparisons listed and the performance of a particular optical components is not limited by the comparisons shown in FIG. 4. Additional comparisons between a reflection signal and an expected signal and between signals received at the photodetectors may be used to monitor performance of optical components.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems of the present disclosure, as described above and shown in the drawings, provide for a system and method for monitoring performance of optical components. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of detecting optical subsystem failures, comprising:
   emitting a pulsed light beam from a laser through an external window towards a cloud;
   receiving a reflection signal indicative of a portion of the beam reflected by the external window and a portion of the beam reflected by the cloud;
   comparing the reflection signal to an expected signal to monitor for at least one of degradation of an optical component and presence of the cloud; and
   detecting degradation of the optical component and presence of the cloud based on the comparison;
   wherein the comparing and detecting are performed by a processor operatively coupled to a memory.

2. The method of claim 1, wherein emitting includes emitting the light beam at a predetermined frequency.

3. The method of claim 1, wherein detecting includes detecting laser degradation by comparing amplitude, pulse width and pulse frequency of a reflection signal received by a trigger photo diode to amplitude, pulse width and pulse frequency of the expected signal.

4. The method of claim 1, wherein detecting includes detecting transmitter optic misalignment by comparing amplitude of a reflection signal received by a trigger photo diode with amplitude of a reflection signal received by a photodetector measuring reflection off the window.

5. The method of claim 1, wherein detecting includes detecting transmitter optic misalignment by comparing amplitude of a reflection signal received by a trigger photo diode with amplitude of a reflection signal received by a receiver photodetector.

6. The method of claim 1, wherein includes detecting window contamination by comparing amplitude of a reflection signal received by a photodetector measuring reflection off the window with amplitude of the expected signal.

7. The method of claim 1, wherein detecting includes detecting window contamination by comparing amplitude of a reflection signal received by a photodetector measuring reflection off the window with amplitude of a reflection signal received by a trigger photo diode.

8. The method of claim 1, wherein detecting includes detecting receiver optics misalignment and photodetector degradation by comparing amplitude of a reflection signal received by a receiver photodetector with amplitude of a reflection signal received by a trigger photo diode.

9. The method of claim 1, wherein detecting includes detecting receiver optics misalignment and photodetector degradation by comparing amplitude of a reflection signal received by a receiver photodetector with amplitude of a reflection signal received by a photodetector measuring reflection off the window.

10. The method of claim 1, wherein the optical component is selected from the group consisting of transmitter optics, receiver optics, lasers and photodetectors.

11. A system comprising:
a laser configured to emit a pulsed light beam through an external window towards a cloud;
at least one photodetector configured to detect a returned pulsed light beam from the laser; and
a processor operatively connected to the at least one photodetector and a memory, wherein the memory includes instructions recorded thereon that, when read by the processor, cause the processor to:
compare the reflection signal received at the at least one photodetector, the reflection signal indicative of a portion of the pulsed light beam emitted by the laser and reflected by the external window and the cloud to an expected signal to monitor for at least one of degradation of the at least one photodetector and presence of the cloud; and
detect degradation of the at least one photodetector and presence of the cloud based on the comparison.

12. The system as recited in claim 11, wherein the memory includes instructions recorded thereon that, when read by the processor, cause the processor to:
detect laser degradation by comparing amplitude, pulse width and pulse frequency of a reflection signal received by a trigger photo diode to amplitude, pulse width and pulse frequency of the expected signal.

13. The system as recited in claim 11, wherein the memory includes instructions recorded thereon that, when read by the processor, cause the processor to:
detect transmitter optic misalignment by comparing amplitude of a reflection signal received by a trigger photo diode with amplitude of a reflection signal received by a photodetector measuring reflection off the window.

14. The system as recited in claim 11, wherein the memory includes instructions recorded thereon that, when read by the processor, cause the processor to:
detect receiver optics misalignment and photodetector degradation by comparing amplitude of a reflection signal received by a receiver photodetector with amplitude of a reflection signal received by a photodetector measuring reflection off the window.

15. The system as recited in claim 11, wherein the memory includes instructions recorded thereon that, when read by the processor, cause the processor to:
detect receiver optics misalignment and photodetector degradation by comparing amplitude of a reflection signal received by a receiver photodetector with amplitude of a reflection signal received by a trigger photo diode.

* * * * *